United States Patent [19]

Holmes

[11] 4,176,750

[45] Dec. 4, 1979

[54] SORTING SYSTEM AND APPARATUS

[75] Inventor: Robert G. Holmes, Columbus, Ohio

[73] Assignee: Ohio Agricultural Research and Development Center, Wooster, Ohio

[21] Appl. No.: 940,075

[22] Filed: Sep. 6, 1978

Related U.S. Application Data

[63] Continuation-in-part of Ser. No. 778,794, Mar. 18, 1977, Pat. No. 4,116,339.

[51] Int. Cl.² .................. B07C 1/00; A01D 33/02
[52] U.S. Cl. .................. 209/699; 209/699; 209/640
[58] Field of Search .............. 209/699, 640, 931; 171/27, 28, 126, 130, 131, 133

[56] References Cited

U.S. PATENT DOCUMENTS 3,680,694  8/1972  Hamann ..................... 209/637

*Primary Examiner*—Allen N. Knowles

*Attorney, Agent, or Firm*—Millard, Cox & Smith

[57] ABSTRACT

Method and apparatus for sorting objects exhibiting identifiable dynamic response to vibrational phenomena, such objects including potatoes, onions, tomatoes and other comestibles. The system utilizes an elongate sorting zone incorporating a surface which oscillates at a predetermined frequency and amplitude which varies from a minimum at the input of the zone to a maximum value at the output thereof. The objects to be sorted move along the zone supported from two positions for a coding interval promoting their dynamic reaction with the oscillatory surface. Objects with higher resilience characteristic are rejected from the zone, while those exhibiting a lesser resilence are transported therethrough. The oscillatory surface is dynamically balanced and readily mounted upon field harvesting devices. By adjustment of frequency of the sorting zone oscillatory surfaces, a multi-stage sorting system is made available.

34 Claims, 11 Drawing Figures

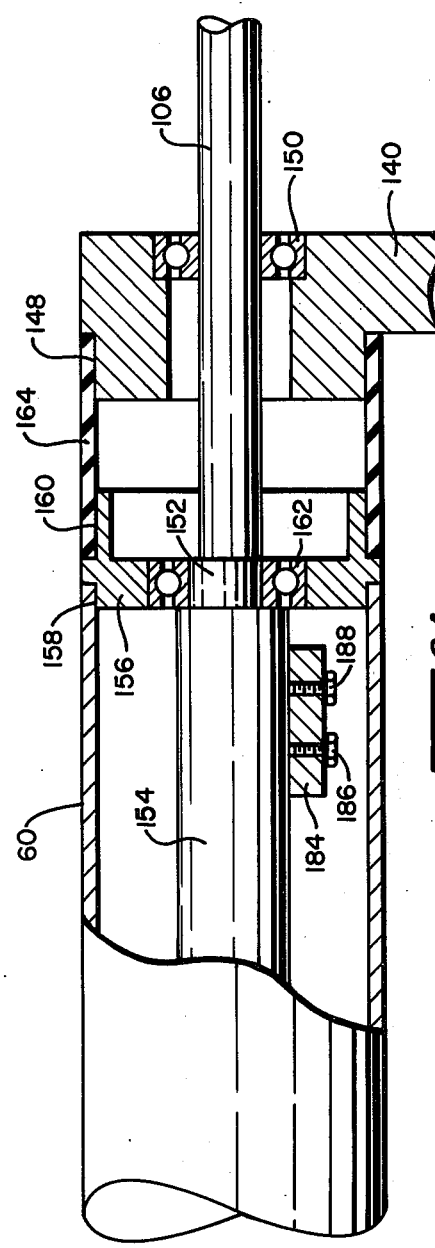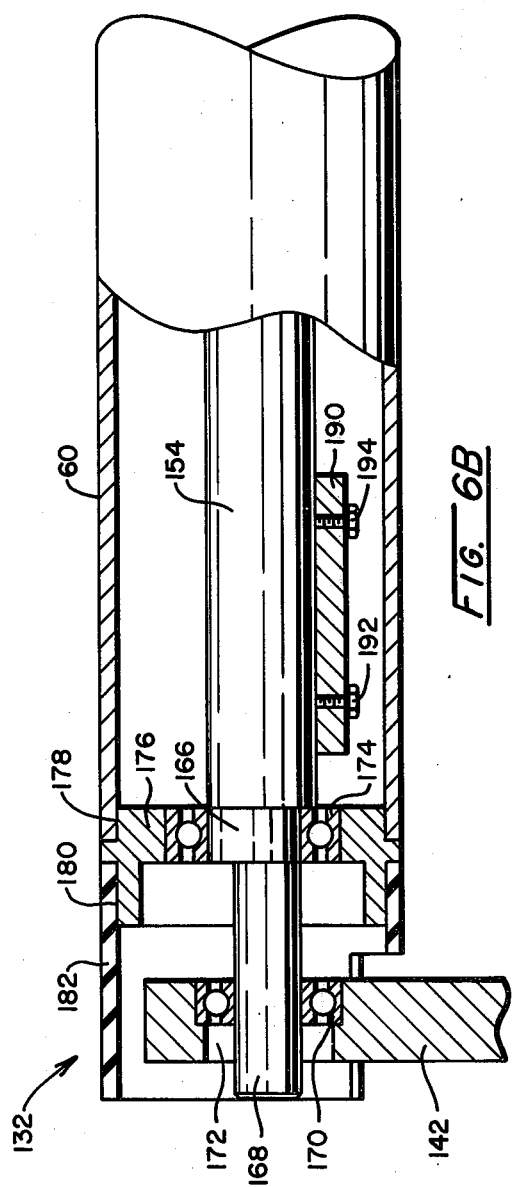

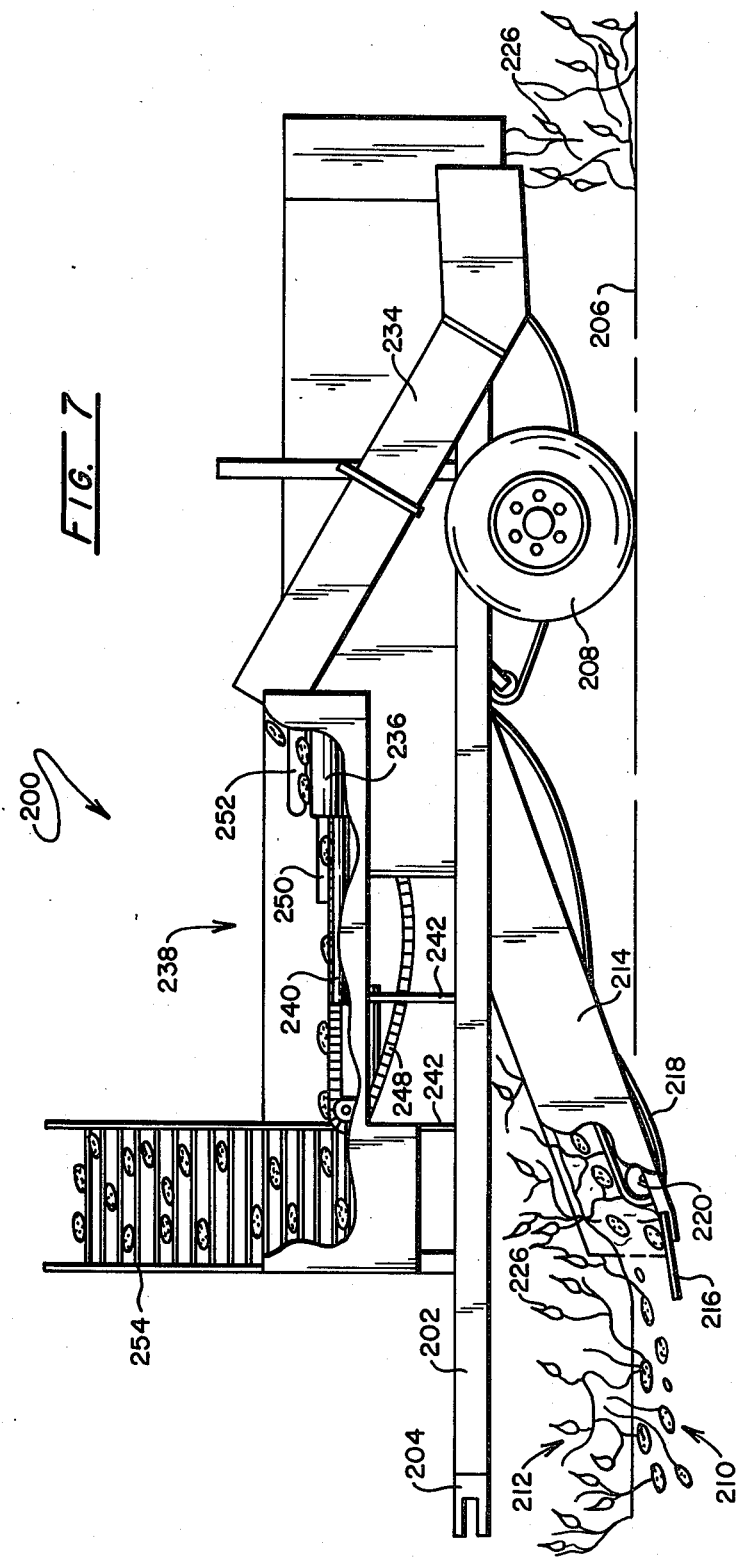

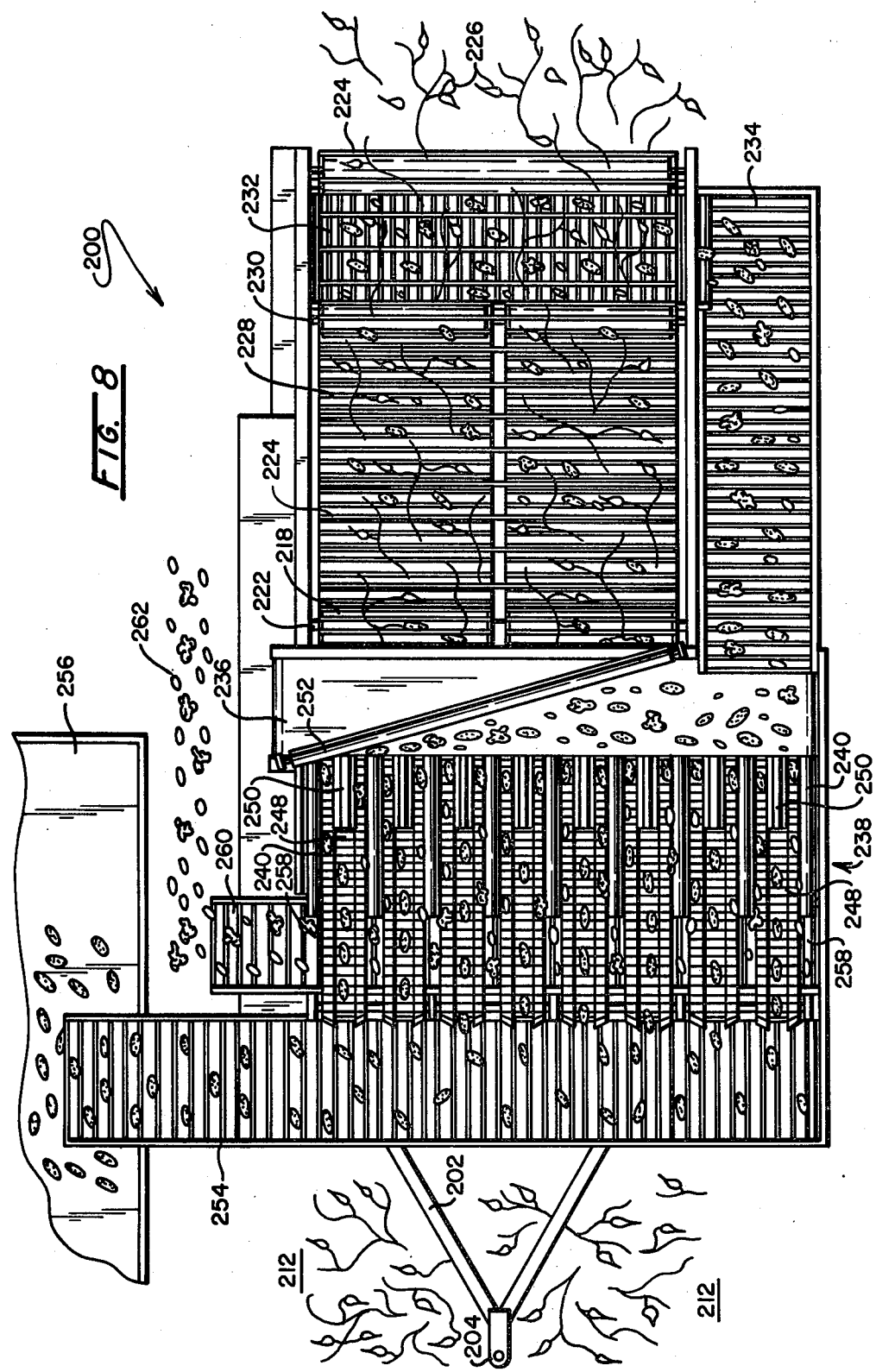

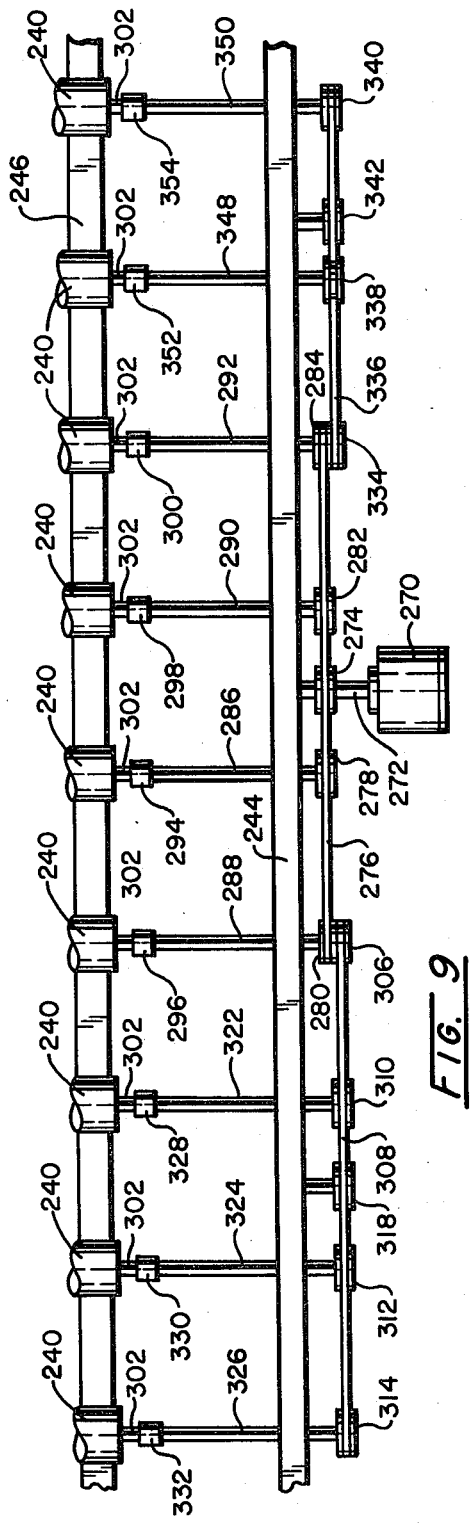
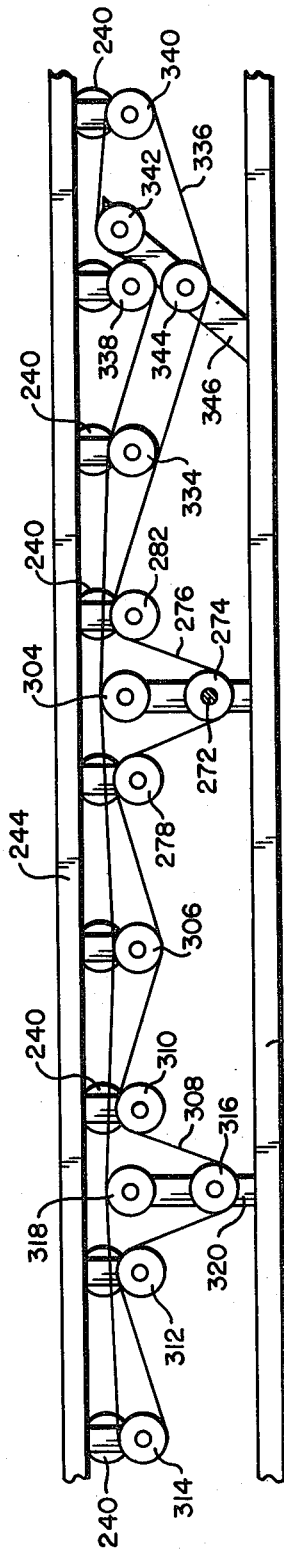

SORTING SYSTEM AND APPARATUS

RELATED APPLICATIONS

The present application is a continuation-in-part of U.S. application Ser. No. 778,794, filed Mar. 17, 1977, now U.S. Pat. No. 4,116,339.

BACKGROUND

This invention is concerned with coding related sorting systems, methods and apparatus particularly useful in the agricultural industry. The sorting of agricultural commodities during or shortly following the time of their harvest has assumed increasing importance as an aspect in achieving both production economies and higher quality processing and packaging prior to the introduction of the commodities into the consumer market. Concerning the utilization of coding and sorting systems in conjunction with harvesting, the development of economical and efficient field sorting techniques for several agricultural commodities would be of considerable value to the industry. As one example, potatoes, by virtue of the soil conditions extant in the regions of their cultivation, are removed from the ground in conjunction with rocks, clods and the like which ultimately must be separated from the harvested material bulk. Typically, potatoes are harvested by a tractor-drawn mechanism having blades which are driven beneath the ground surface below the growth level of the potatoes and which serve to drive the potatoes, associated vines, rocks and earth clods upwardly. Chain-type conveyors mounted upon the harvester then transport the potatoes as well as the earth clods and rocks in a generally upwardly disposed direction and in a manner intended to achieve as much separation of the clods and rocks from the potatoes as is possible. Following passage through a devining position, additional harvester mounted conveyors move the potatoes with unseparated clods and rocks past hand separating stations. Depending upon field conditions at this point in the harvesting process, typically up to 50 percent of the harvested bulk will be present as rocks and clods. Usually, three to five farm laborers ride the harvester to man the sorting stations and attempt to remove the rocks and clods from the conveyors by hand. With the increasing speeds of harvester movement now employed in the harvesting procedures (i.e. three to five miles per hour), the exertions of field hand labor are inadequate to achieve substantial sorting. As of consequence, the potato harvest conveyed from the sorting stations to trucks intended for transporting the materials to warehouses will exhibit a rock and clod content typically in the range of 20 percent and more of the bulk thereof. Upon being trucked to storage facilities, the potatoes subsequently are hand sorted to remove damaged or rotted potatoes, rocks and clods prior to bagging and sale. The latter occurrence of damaged and rotted potatoes is considered to be at least in part due to the transporting of unseparated rocks and potatoes into trucks during harvesting, the rocks falling with the potatoes from position to position and causing damage. Resort to later sorting of substantial quantities of rocks and earth at the storage facilities contributes two cost factors to the harvest, that associated with sorting itself and that involved in removing and disposing the not insignificant quantities of rock and earth generated by the last sorting step. The tonnage of soil maneuvered in the course of potato harvesting provides some insight into the quantities under consideration. Harvesting two rows of vines at a speed of two miles per hour with digger blades set at a depth of four inches means that the harvester aprons are lifting an average of six to ten tons of soil per minute.

The procedures for harvesting onions are somewhat similar, the environment within which the machinery is required to operate being rigorous and dirty, as is the case with potato harvesting. Generally, the quantity of rocks and earth clods removed with onions during the harvesting thereof is considerably greater than that associated with potato harvesting as described above. Typically, 50 percent or more of the bulk of the onion harvest will be present as rocks and clods.

As is apparent, in either harvesting procedure, where removal or sorting procedures are carried out at processing or collection stations removed from the locale of the producing fields, higher expenditures are necessitated for hauling the greater weight and bulk of the harvest. Conversely, where rock materials and the like can be removed at the site of the harvest, disposal problems associated with waste are minimized and the cost of transporting the harvested product to collection regions or stations is considerably lower. By separating the dirt clods early or in conjunction with the harvesting procedure itself, convenience and economy readily are recognized. As is apparent, a separating system mounted upon the harvester itself which is capable of efficiently identifying or coding both rock and earth clods and separating them from potatoes or onions will be of considerable value to the agricultural industry. To be practical, however, such a sorting system must be capable of operating efficiently under the dirty and rigorous conditions extant in a harvesting environment.

Perhaps one of the more complex harvesting techniques is associated with the tomato. Currently, about 300,000 acres in California and a smaller but significant number in the midwest are devoted to the production of processing tomatoes. Substantially all of the California acreage is machine harvested, while about 10% of the acreage in the midwestern locale is so harvested. Presently grown tomato cultivars ripen non-uniformly and, as a consequence, they either must be harvested by hand as they ripen, or, if practical, once-over mechanical harvesters are employed, the tomatoes all being harvested at one time and the resultant harvest providing a bulk quantity thereof which must subsequently be sorted to remove green or immature fruit. Particularly in consequence of labor related economic factors, the industry has looked with favor toward harvesting procedures of the once-over variety wherein the vines are uprooted, all tomatoes removed therefrom and transported to collection stations for packing house processing. Where field sorting of the tomatoes in accordance with their degree of ripeness is provided, such provision generally is made through the utilization in the field of about ten to twenty-five laborers who ride upon the harvester to carry out visual coding and sorting. The consequent labor expense as well as the significant increase in machine size and weight have been found to impose severe limitations on the effectiveness of the mechanical harvesting system. Size and weight are particularly complicating factors where the harvesters are utilized in wet or soggy fields, an environmental condition very often encountered in the midwestern regions. For a more detailed discussion of the latter problems, reference is made to the following publication:

I. Harbage, R. P., T. H. Short, and Dale W. Kretchman. (1972). Considerations for Mechanizing Processing Tomato Production in Ohio. *Agricultural Engineering Series 12*, Ohio Agricultural Research and Development Center, Wooster, Ohio.

Where the extent of acreage involved in a given harvesting region is sufficiently large, more expensive machinery incorporating complete sorting systems becomes more practical, however, particularly in midwestern regions and the like, such cost considerations generally have precluded the utilization of harvesting systems incorporating automatic sorting devices. However, the need remains for a practical embodiment of a harvester mounted sorting system inasmuch as typical tomato cultivars do not ripen uniformly. Consequently, once-over harvesting procedures necessitate the collection of tomatoes of a broad variety of maturities including immature fruits, the value of which is considered dimissible. This situation is particularly prevalent in the midwest where mechanical harvesting commences when about 30% or more of the fruit is green or immature. Additionally, rainfall during harvesting periods is generally found to be higher in the midwest than in other regions, thus creating wet ground conditions which, as noted above, hinder movement of the harvesters in the field. This climate also asserts greater variation in the maturity range of a harvested crop. Further information concerning such harvesting aspects may be found in Publication I and the following publication:

II. Stephenson, K. Q. (1974). Color Sorting System for Tomatoes. *Transactions of ASAE*, 55: 1185.

Several varieties of tomato harvesters are currently produced, the capacity for more current models being in the range of about thirty tons of fruit per hour. Where manual sorting is incorporated with the machine, such capacities are considerably limited. Human sorting has been found to average about one-half ton per hour on a per capita designated basis. As is apparent, some other form of sorting is required to improve sorting capacities. For further discussion concerning the above harvesting considerations, reference is made to Publication I and the following Publication III. Johnson, Paul E. (1973). Tomato Harvesters for the Midwest. Unpublished paper. Agricultural Extension Service, Purdue University.

IV. Wright, Paul L. (1972). The Latest on Machine Harvesting of Processing Tomatoes in Ohio. Unpublished paper, Agricultural Extension Service, Fremont, Ohio.

In view of the significant quantity of machine picked tomatoes which are immature or green, and which have no significantly discernible value, a considerable advantage would accrue with the utilization of an economic field harvesting scheme automatically disposing of such tomatoes in the field site for natural biodegradation. Without such sorting, all harvested tomatoes are required to be hauled to the processing plant for sorting purposes, a requirement which levies higher costs upon the harvesting procedure.

Looking now to in-plant sorting techniques, typical sorting systems involve a non-destructive coding followed by a segregation technique sometimes referred to as "switching". While most industrial sorting procedures for comestibles are carried out by labor utilizing both the visual as well as tactile senses, investigations have been conducted into techniques for reducing the labor intensity of such procedures. For example, with respect to tomatoes, the specific gravity thereof has been found to increase with ripeness and has been suggested as a sorting technique. In one such arrangement, a gravity sorting system is provided wherein tomatoes are floated in solutions of ethanol and water. Typically eighty to ninety percent of the green tomatoes and fifteen to twenty-five percent of lower quality acceptable tomatoes will float. In another such arrangement, a low percentage brine solution has been utilized in an arrangement wherein the rate of upward floatation movement of tomatoes served as the coding procedure. For further information concerning such coding and sorting techniques reference is made to the following publications:

V. Kattan, A. A., R. H. Benedict, G. A. Albritton, H. F. Osborne, and C. Q. Sharp. (1968). Mass Grading Machine-Harvested Tomatoes. *Arkansas Farm Research*, Vol. XVIII, No. 1, January-February, 1968, p. 5.

VI. Kattan, A. A., C. Q. Sharp, and J. R. Morris. (1969). A Mechanical Sorter for Tomatoes. *Arkansas Farm Research*, Vol. XVIII, No. 1, p. 8, January-February, 1969.*

*See Also: Gould, W. A. "Mass Sorting of Mechanically Harvested Tomatoes." Research Circular 209, December, 1975. Ohio Agricultural Research and Development Center, Wooster, Ohio.

Sorting concepts for tomatoes based upon the light reflectance properties thereof have been proposed or developed as apparatus, for instance, electronic color sorters wherein light reflecting from the fruit is sensed by a photoresponsive device. Utilizing appropriate coding or selecting circuitry, a form of switching then is incorporated with the sorting system such as an air blast or plunger providing an ejection function. These systems are available only at such relatively higher costs as are considered above the level of practicality for plant or field installations of smaller extent. For field harvesting adaptation, the electronic or light reflectance systems are called upon to operate under somewhat rigorous and dirty field conditions. Accordingly, maintenance costs of considerable extent necessarily are encountered in addition to a relatively high initial capital investment. Further elaboration upon this form of sorting for tomatoes is provided, for example, in Publication II and in the following publications:

VII. Heron, J. R. and G. L. Zachariah. (1974). Automatic Sorting of Processing Tomatoes. *Transactions of ASAE*, 55: 987.

VIII. Stephenson, K. Q. (1964). Selective Fruit Separation for Mechanical Tomato Harvester. Agricultural Engineering, 45: 250-253, May, 1964.

IX. Stephenson, K. Q. (1966). Automatic Sorting System for Tomato Harvesters. *Procedures of National Conference on Mechanization of Tomato Production*, Purdue University, Lafayette, Indiana. 1966.

Investigations also have been conducted into the response of tomatoes and other fruits to vibrational phenomena. For example, a downwardly inclined trough mechanically excited by an electrodynamic shaker utilized for the purpose of separating grapes into ripeness categories has been described in U.S. Pat. No. 3,680,694 as well as in the following publication:

X. Hamann, Donald D. and Daniel E. Carroll. (1971). Ripeness Sorting of Muscadine Grapes by Use of Low-Frequency Vibrational Energy. *Journal of Food Science*, 36: 1049.

This same approach has been used in similar attempts to sort blueberries as described in the following publication:

XI. Hamann, D. D., L. J. Kushman, and W. E. Ballinger. (1973). Sorting Blueberries for Quality by Vibration. *Journal of the American Society for Horticultural Science,* Vol. 98, No. 6, p. 572-576, Nov., 1973.

The above studies generally recognize that vibrational sorting is based upon differences in resiliency of the object subjected to such vibration and that correlations are available between fruit or vegetable ripeness and this exhibited resiliency. The response of tomatoes to vibration as a potential criterion for sorting has been studied. For instance, the resonant frequencies of tomatoes of various maturities has been investigated, the response of a green tomato so excited being found to be approximately six times that of a ripe tomato. A more detailed discourse concerning this subject is provided in the following publication:

XII. Stephenson, K. Q., R. K. Byler, and M. A. Wittman. (1973). Vibrational Response Properties as Sorting Criteria for Tomatoes. *Transactions Of ASAE,* 16: 258, March, 1973.

To the present time, sorters operating upon vibrational principles have been found to be somewhat impractical, their capacities for field harvesting applications being considered too low for the volumes of sorting usually required, and the mechanisms generating required vibration being both expensive and difficult to use at requisite frequencies.

SUMMARY

The present invention is addressed to a system, method and apparatus for sorting objects exhibiting a classifiable dynamic response to vibrational phenomena. Incorporating an oscillatory surface to provide coding performance, the apparatus of the invention remains dynamically balanced while providing a capability for sorting high volumes of such comestibles as potatoes, onions and tomatoes. This high volume sorting capacity is achieved while still retaining a practicality in size and operation commensurate with an incorporation thereof within mechanical field harvesters and the like.

The invention enjoys a capability for accommodating to the sorting of a variety of comestibles as well as to various ranges of maturities of such fruits as tomatoes. Similarly, the system readily is adapted to the sorting of fruit having been subjected to freezing conditions and the like, void content phenomena in such vegetable as potatoes and bloat conditions encountered in the processing of cucumbers for pickles and the like. Additionally, the system may be incorporated in the field harvesting of a broad variety of commodities including the earlier noted onions and potatoes as well as tomatoes. The statistical reliability of sorting achieved with the invention is enhanced through its capability for relatively simple field tuning, achieved through the expedient of frequency adjustment over the oscillatory surface utilized within the sorting zone of the system.

Another aspect and object of the invention is to provide an apparatus for carrying out the noted sorting procedures which includes an arrangement for introducing a quantity of the objects to be sorted at the entrance location of a sorting zone which extends along a given longitudinal axis. An oscillatory surface is located within the zone along its axis and is driven by a dynamically balanced rotative drive member to impart an oscillation or vibration of a predetermined frequency and amplitude characteristic to the oscillatory surface. A transporter arrangement is provided for moving the objects to be sorted within the zone in orientations promoting their kinetic reaction with the oscillatory surface. This transporter is formed of a series of parallel, regularly-spaced carrier components, the upwardly disposed thin surfaces of which provide a two-position support for each of the objects. This support improves the capability for reacting the objects with the oscillatory surface sufficiently to carry out the proper switching. Of additional importance, the spacing between the parallel carrier components permits dirt from the sorting or field environment to fall through the transporter to permit it to operate more efficiently. In one arrangement, these parallel and spaced carrier components are configured to define not only a support surface for holding the object, such as potatoes, rocks, or earth clods, but also a receiving surface. Thus, when potatoes or onions are sorted from earth clods and rocks, the potatoes or onions are dynamically driven onto the receiving surface and moved through the zone, while rocks and clods are seen to remain on the surface to exit from the zone. In sorting potatoes from rocks and earth clods, the amplitude range selected for the oscillatory surface extends from about 0.075 to 0.150 inch. Additionally, the oscillative frequency is selected from within the range of about 30 to 70 Hertz. The inclination of the noted upwardly disposed coding surface is selected between about 20° and 40° depending upon the field conditions encountered for harvester mounted sorting devices.

Another object and feature of the invention provides an improved potato harvesting apparatus incorporating the dynamic sorting assembly described above. When mounted upon the harvester, the sorting apparatus is provided in a series of parallel disposed zones to accomodate for the relatively high volume of the harvest. With the arrangement, potatoes are separated from rocks and earth clods for transportation to storage facilities, while the rock and earth clods are disposed of in the field. By virtue of the spaced carrier components of the transporter arrangement of the sorting zone, dirt otherwise carried through the process is effectively accomodated for and a practical harvesting apparatus is developed.

Another feature and object of the invention is to provide a sorting apparatus of the type described wherein the drive arrangement thereof includes a drive member which is present as an elongate shaft extending along the longitudinal axis of the sorting zone from a first terminus, located in the vicinity of the entrance location of the zone, to a second terminus, positioned in the region of the output of the zone. A bearing arrangement for supporting the elongate shaft at least in the vicinity of the first and second termini is provided to achieve a symmetrical and balanced rotation of the shaft about the longitudinal axis of the zone. A bearing surface is situated upon the shaft intermediate the noted termini and is movable in driven relationship with the shaft but has an axis of rotation eccentric with respect to the longitudinal axis of the zone. The structure of the oscillating surface includes a supporting component which is arranged in driven relationship with the bearing surface of eccentric orientation upon the shaft. This surface additionally is flexibly restrained such that it is fixed against rotation in and of itself while being permitted to oscillate by virtue of its connection with the noted supporting component. Counterweights are associated with the drive shaft to assure dynamic balance of the system and, with the arrangement, a form of oscillatory motion is imparted to the surface such that any point thereupon moves to define a circular locus of motion. The diameter of that locus is equivalent to the amplitude of oscillation for a given selected point of the surface. Frequency adjustment is readily provided through variation of the speed of rotation of the drive shaft of the apparatus. The objects to be sorted, for example, potatoes, earth clods and rocks are moved in single file fashion upon the above-described transport components positioned adjacent the oscillating surface. Potatoes, exhibiting a higher resilience, dynamically react to contact with the oscillative surface by ejective movement transverse to the longitudinal axis of the zone and are received at the above-described receiving surface. Conversely, because of their high spring constant, energy is not transmitted to rocks, and because of their high internal damping, earth clods are not moved from the transporter arrangement by virtue of their contact with the oscillatory surface and are transported through the zone to exit therefrom at the output end or second terminus thereof.

Another object of the invention is to provide a method of sorting a quantity of discrete objects exhibiting classifiable dynamic response to vibrational phenomena which includes the steps of introducing a quantity of objects to the input of a sorting zone and supporting each of the objects by two spaced thin linear support surfaces while moving the objects in sequential, single-file fashion in a given direction through the zone. Simultaneously with the transporting of the objects through the zone, there is promoted a kinetic reaction of the objects by contact thereof with a curved surface disposed along the zone and oscillating at a predetermined frequency and at amplitudes which increase in value along the zone from its input to its output. The objects dynamically reacting to contact with this curved surface by ejective movement transverse to the direction of their transportation are received and represent one category of classification. Similarly, those objects of another classification for sorting which are transported through the zone to exit from its output are received of or disposed of in accordance with their designated classification. Where the objects sorted are potatoes, rocks and earth clods, the potatoes are dynamically reacted to be ejectively moved transversely to the direction of their transportation, while rocks and earth clods move through the zone in continuous vibratory contact with the oscillatory surface.

Other objects of the invention will, in part, be obvious and will, in part, appear hereinafter.

The invention, accordingly, comprises the system, method and apparatus possessing the construction, combination of elements, arrangement of parts and steps as are exemplified in the following detailed disclosure. For a fuller understanding of the nature and objects of the invention, reference should be had to the following detailed description taken in connection with the accompanying drawings.

BRIEF DESCRIPTION OF THE DRAWINGS

FIG. 6A is a partial sectional view of the drive and oscillatory arrangement of the apparatus of FIG. 1 at one terminus thereof;

FIG. 6B is a partial sectional view of an opposite terminus of the drive and oscillatory surface arrangement of the apparatus of FIG. 1;

FIG. 7 is a side elevational view of a potato harvesting apparatus incorporating the sorting apparatus of the instant invention;

FIG. 8 is a top view of the harvesting apparatus of FIG. 7;

FIG. 9 is a partial bottom view of the drive system of the sorting station of the harvester apparatus of FIG. 7; and FIG. 10 is an end view of the drive arrangement of FIG. 9.

DETAILED DESCRIPTION

Figure 1:
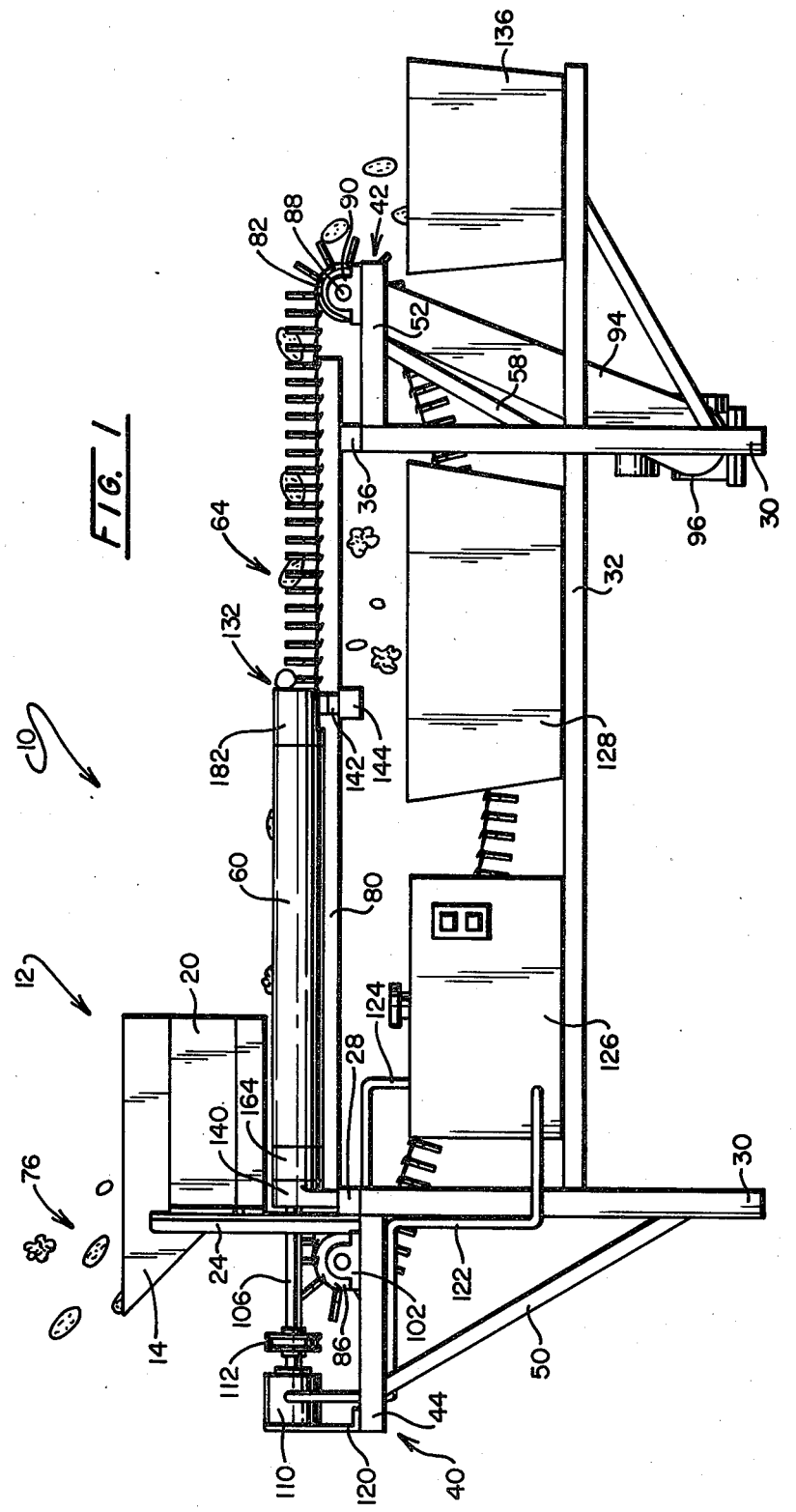
FIG. 1 is a side view of an embodiment for potato, or onion and earth clod and rock sorting apparatus according to the invention.

One embodiment for the present invention is concerned with a practical system for the sorting of tomatoes according to maturity. This sorting is carried out on the basis of what may be described as the characteristic resiliencies established by tomato cultivars during various stages of ripening or maturity. Such resiliencies, in turn, generally may be considered as ratios of effective spring constant to internal damping. As a prelude to considering the actual technique of the invention utilized to achieve statistically reliable sorting, a cursory observation of the morphology and physiology of this fruit, belonging to the genus and species *Lycopersicon esculentum,* may be of value. The tomato fruit generally comprises a fleshy pericarp disposed about an outer periphery which is covered by a thin skin and which surrounds a number of locules. These locules are cavities which are separated by fleshy cross-walls of about the same thickness as the pericarp and contain seeds attached to a placenta. The number of locules disposed within the tomato generally varies with the cultivar. For further discussion, reference is made to the folowing publication:

XIII. Wilson, C. L., W. E. Loomis, and T. A. Steeves. (1971). Botany. 5th ed. New York: Holt, Rinehart and Winston, Inc. 1971

The physiology of tomato fruit formation generally is considered to involve three phases: fruit development; ripening; and senescence. As the tomato reaches its approximate maximum size, it is considered to be mature and is green in color due to its chlorophyll content and exhibits a "hardness". This state of maturity must be achieved before natural ripening occurs. As the tomato begins to change color toward red there is a marked increase in the respiration rate thereof, a phenomenon referred to as the climacteric rise. This respiration rate reaches a maximum value, referred to as the climacteric, whereupon the rate commences to decline. The tomato may be considered ripe shortly after achieving climacteric, and this ripening commences from the inside thereof and progresses toward the outside. Ripening is accompanied by a change in color from green to red as well as changes in firmness in consequence of pectic substance alteration and in flavor producing alterations in aromatic organic compounds making up the fruit. Each of these aspects of maturation represents an important aspect in the requisite sorting of the tomatoes for purposes of industrial processing. With regard to these processes, color change of the tomatoes in the course of the ripening occurs in a sequence commencing with green, followed by an alteration therefrom towards white and thereafter towards red or orange depending upon the environmental temperature. The softening of tomatoes during the ripening process is considered to be due largely to the conversion of protopectin and calcium pectate in the middle lamellae and primary cell walls of the pericarp to soluble pectins. For further discourse concerning this process, reference is made to the following publications:

XIV. Goss, James A. (1973). *Physiology of Plants and Their Cells.* New York: Pergammon Press Inc., 1973.

XV. Khudairi, A. Karim. (1972). The Ripening of Tomatoes. *American Scientist,* Volume 60, p. 696, November-December, 1972.

XVI. Gruelach, Victor A. (1973). *Plant Function and Structure.* New York: The MacMillan Company, 1973.

XVII. Mohr, W. P. and M. Stein. (1969). Fine Structure of Fruit Development in Tomato. *Canadian Journal of Plant Science,* Volume 49, No. 5, p. 549-553, Sept., 1969.

As is described in the following publication:

XVIII. Gould, Wilbur A. (1975). A Preliminary Report on Mass Sorting of Mechanically Harvested Tomatoes. Horticultural Dept. Series 417, Dept. of Horticulture, Ohio Agricultural Research and Development Center, Wooster, Ohio. January, 1975.

the grading of tomatoes by color has been the subject of investigation, and as a consequence, a variety of grading systems have been brought into use. For example, (a) the U.S. grade standards established in 1933; (b) a dual grade based upon wave length utilized in California; (c) a four grade designation developed by the Ohio Agricultural Experiment Station in 1952; and (d) a USDA system utilizing a tomato colorimeter to provide a four-way classification to subjectively evaluate defects.

As noted above, firmness also is an important attribute for the grading of tomatoes for processing and a variety of studies have been conducted in connection with this aspect. The tomato fruit is a viscoelastic biological material and, accordingly, its mechanical properties are not readily defined with consistency. Further, as may be expected, the mechanical properties of the tomato vary with the variety thereof as well as the location upon the surface thereof at which firmness is tested. Investigators have reported that at least three internal factors affect firmness, to wit, rigidity of the cell wall, stiffness of the intercellular bonding agents and turgidity (turgor pressure) within the cells of the fruit. Generally, three basic measurements have been utilized to determine static or quasi-static firmness, these being (a) the force to achieve a given deformation within the product; (b) the deformation occurring under a standard force; and (c) the force-deformation ratio within the material during mechanical loading. For further discussion in connection with these aspects, reference is made to the following publications:

XX. Finney, Essex E., Jr. (1969). To Define Texture in Fruits and Vegetables. *Agricultural Engineering,* 50: 462-465, August 1969.

XXI. Hamson, A. R. (1952). Measuring Firmness in a Breeding Program. *Procedures of the American Society for Horticultural Science.* 60: 425-433.

XXII. Kattan, A. A. (1957). Changes in Color and Firmness During Ripening of Detached Tomatoes, and the Use of a New Instrument for Measuring Firmness. *Procedures of American Society for Horticultural Science,* 70: 379-384.

For optimum industrial processing, the harvested tomatoes, as delivered in bulk to a processing station, will incorporate green, pink, soft ripe, firm ripe, and overripe tomatoes. Essentially, only the firm ripe designated tomatoes are utilized for whole pack processing, while the soft ripe and pink are incorporated in paste and juice type processed foods.

In connection with the above, the term "pink" is intended to mean a tomato which has approached a white or red coloration but still retains regions of green coloring such that it would be unacceptable for use in whole pack processing. These tomatoes are relatively firm, however, and are readily utilized in the production of juices and paste.

The term "ripe" in connection with the modifiers "firm" and "soft" is intended to mean a tomato which is fully red in color and the modifiers have the obvious meaning.

Overripe tomatoes may be considered as rotten and are not used and, for the most part, green tomatoes also find little use for industrial food processing. Only a dimissible portion of such green tomatoes are utilized for relish maufacture and like by-products. For field harvesting purposes wherein a sorter is combined with a fully mechanized harvester, the green designated tomatoes only are rejected and usually disposed of directly upon the field from which they were picked.

Potato tubers, while varying in form from roundish to irregular oblong in shape, exhibit somewhat consistent turgidity with respect to any given variety and harvest site, coloration and degree of maturity not being a variable as with tomatoes. The requisite coding for sorting purposes according to the present invention is one comparing the resiliency of the tuber with that of rocks and earth clods. It has been found that because of the relatively higher turgor pressure of the potato tuber, the energy generated in the course of vibrational sorting can be transferred into it to evoke a pronounced and identifiably consistent dynamic response. By contrast, earth clods, while varying somewhat in resilience with respect to types of earth and moisture content, exhibit a very high internal damping characteristic. Thus, their dynamic response to vibrational energy insertion can be discerned from the corresponding response of potatoes. Rocks exhibit an entirely different characteristic, their hardness and composition generally being equatable with a very high spring constant. As a consequence of this characteristic, energy derived from vibratory coding is not readily transferred thereinto to evoke a dynamic response. Thus, distinct dynamic response characteristics are associated with these three components of a potato harvest.

The bulbous root of the onion, composed of a series of concentric coats, varies in size according to soil and climate, but as in the case of the potato, exhibits a somewhat consistent turgidity with respect to any given variety and harvest site. Similarly, variations in maturity are not generally encountered during harvest as in the case of tomatoes. The relatively higher turgor pressure exhibited by the bulbous root of the onion avails it a distinct vibrational coding characteristic with respect to earth clods and rock in similar fashion as the potato.

Figure 2:
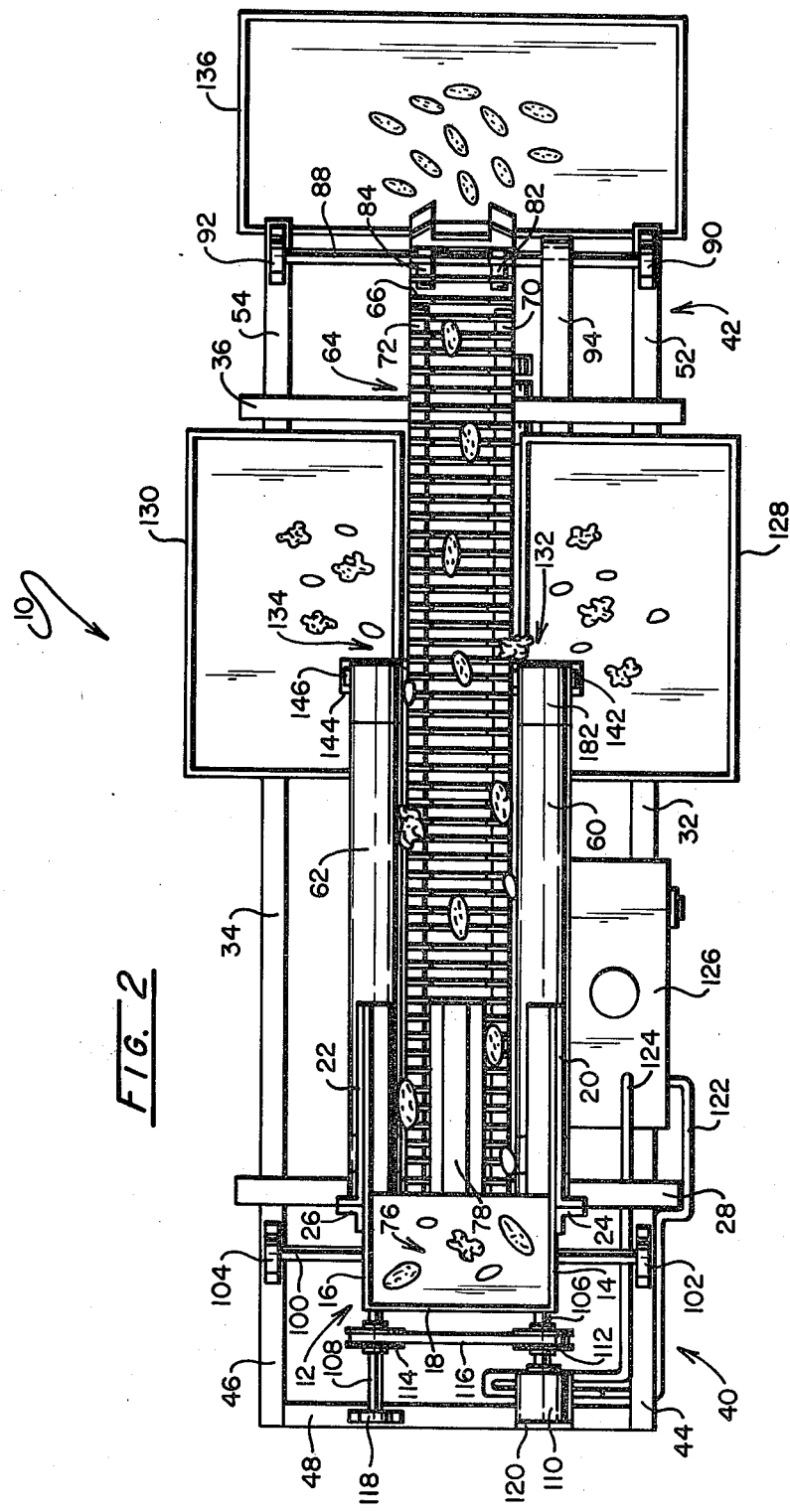
FIG. 2 is a top view of the apparatus of FIG. 1.
Figure 3:
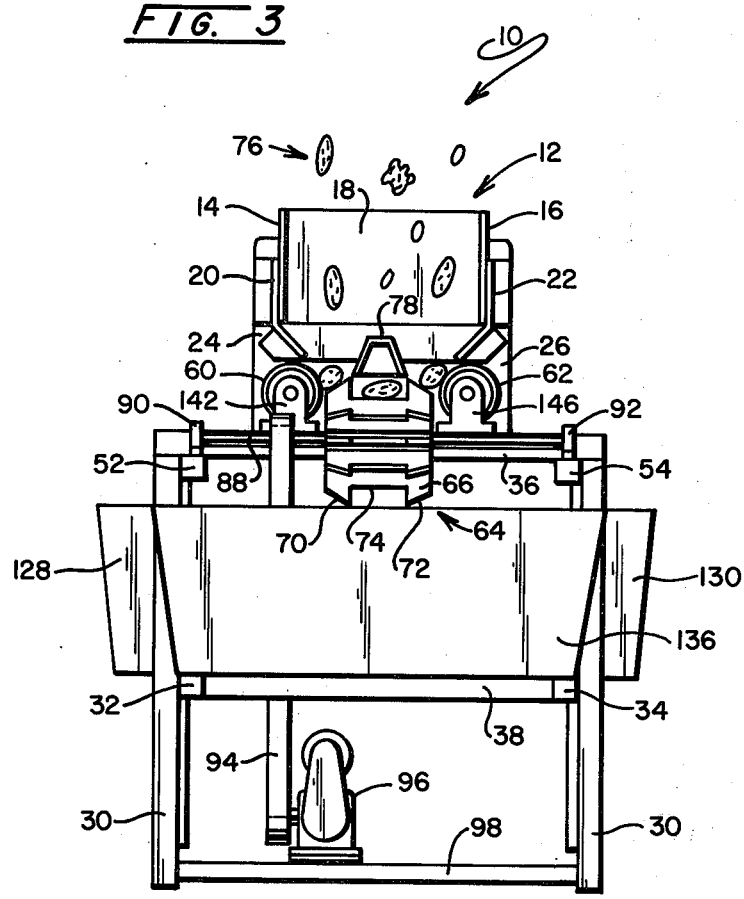
FIG. 3 is an end view of the apparatus of FIG. 1.

Turning now to the mechanical implementation of a sorting arrangement in accordance with the invention, reference is made to FIGS. 1-3, wherein a preferred sorter apparatus is revealed generally at 10. Sorter 10 includes an entrance hopper assembly shown generally at 12 including sidewalls 14 and 16 and an end wall 18. Walls 14 and 16, respectively, are coupled to metal brackets 20 and 22, the lowermost portions of which are bent mutually inwardly to provide a directory arrangement for objects, i.e. potatoes, earth clods and rocks deposited within the hopper assembly 12. Brackets 20 and 22, in turn, are connected, as by bolting or welding, to respective upstanding angle supports 24 and 26, which, in turn, are fixed to an upper horizontal support 28 serving as one component of a supporting frame assembly. Concerning the latter assembly, apparatus 10 is supported at any convenient elevation by four leg members as at 30 and includes two lower horizontal supports 32 and 34 as well as horizontally oriented upper transverse support 36 extending between the forwardly disposed leg members 30. A lower horizontal support 38 (FIG. 3) extends between lower, longitudinally oriented horizontal supports 32 and 34. Support frames 40 and 42 extend outwardly from opposite sides of the main frame body, frame 40 including horizontal members 44 and 46 (FIG. 2) between which is coupled cross member 48. The frame 40 is supported by angularly oriented members, one of which is shown at 50. Similarly, frame 42 includes horizontal members 52 and 54 as well as a cross member 56 and is further supported by angularly oriented members as at 58 (FIG. 1).

Figure 4:
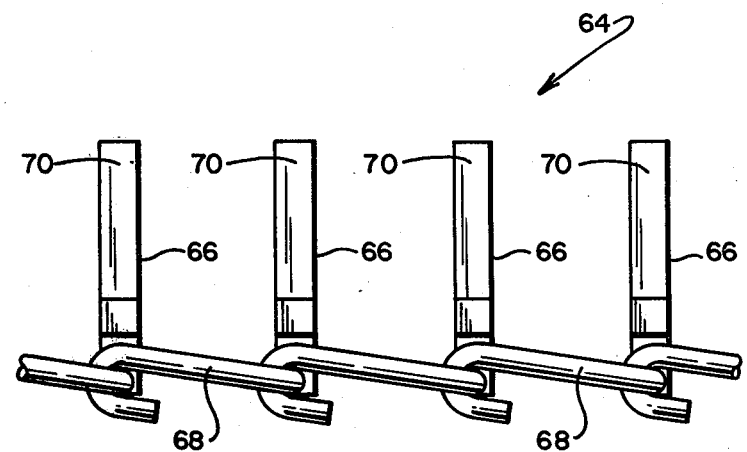
FIG. 4 is a partial side view of a transporter portion of the apparatus of FIG. 1.
Figure 5:
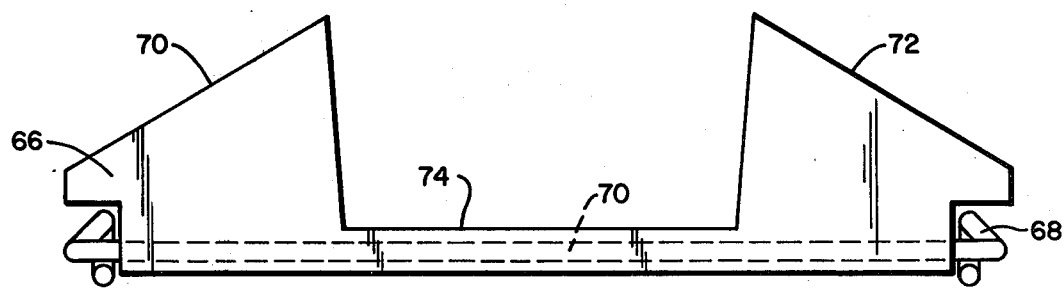
FIG. 5 is a partial front view of a component of the transporter arrangement of FIG. 4.

Entrance hopper assembly 12 is positioned to introduce bulk quantities of objects exhibiting an identifiable dynamic response to vibrational phenomena to the entrance location of two somewhat elongate sorting zones residing adjacent cylindrically-shaped spaced and parallel disposed oscillatory surfaces 60 and 62 (FIG. 2). A transporter represented generally at 64 extends between surfaces 60 and 62 and is formed as a conveyor which moves along and within each of the parallel-disposed sortiing zones. Transporter 64 is formed of a plurality of regularly-spaced parallel carrier components 66 which are pivotally interconnected in endless chain-like fashion. Looking additionally to FIGS. 4 and 5, these carrier components as well as their interconnection are revealed in more detail. Each of the components 66 is preferably fashioned of a somewhat rigid or hard rubber or an equivalent polymeric material suited for the rigorous environment contemplated. The interconnection of successive components 66 is provided by the component 68 of a chain linkage. As shown in FIG. 5, an elongate portion 70 of component 68 extends through component 66 and is adhered thereto. With this arrangement, as the transporter 64 moves through the sorting zone, components 66 are retained in an upright position. Each component 66 is configured having two oppositely disposed support surfaces 70 and 72 (FIG. 5) which are upwardly disposed when the component is within the sorting zone and which extend outwardly from a position adjacent respective oscillatory surfaces 60 and 62. Support surfaces 70 and 72 also extend from the corresponding oscillatory surfaces when within the sorting zones at an upward inclination or angle selected for the objects being sorted as well as environment of sorting. For harvester-mounted applications, the angle with respect to horizontal is selected between about 20° and 40°, an intermediate value being represented in the figures of about 30°. When sorting potatoes, rocks and earth clods, the lengthwise extent of surfaces 70 and 72 is selected as about three inches and the regular spacing of components 66 is provided between about one and two inches. As is apparent, surfaces 70 and 72 serve to support each potato, rock or earth clod from two positions or points to thus improve the response of these objects to the oscillatory surface with which they are in contact. The spacing also is highly advantageous when operating in the rigorous and quite dirty environment of potato or onion harvesting. FIG. 5 further reveals the presence of a receiving surface 74 extending between surfaces 70 and 72 and similarly upwardly disposed when component 66 is within the sorting zone. Note that surface 74 is somewhat depressed with respect to surfaces 70 and 72, that depression serving to permit retention of those objects, i.e. potatoes, which are reacted with the oscillatory surfaces so as to move into the depression.

Returning to FIGS. 1-3, a combination of potatoes, earth clods and rocks is depicted generally at 76 being introduced into entrance hopper 12. These objects 76 fall downwardly along the inclined surfaces of the hopper 12 whereupon they fall upon either of the upwardly disposed support surfaces 70 and 72. To assure their proper positioning, a trapezoidally-shaped elongate cover or shield 78 is supported at the lower surface of hopper 12 to assure that none of the objects 76 fall upon a receiving surface portion 74 of components 66 at the introductory region of the zones. As the transporter conveyor components 66 move through the elongate, parallel sorting zones, they are supported at their undersides by two spaced horizontal components which may be present as bar stock. One of these components is shown at 80 in FIG. 1 extending between upper transverse supports 36 and 38 of the frame assembly. Transporter 64 is driven from supporting drive pulleys 82 and 84 (FIG. 2) at its forward end and passes around idler rollers at the opposite end of the assembly, one of which is shown at 86 in FIG. 1. Conveyor drive pulleys 82 and 84 are fixed for driven rotation upon a shaft 88 which is rotatively supported by spaced bearing blocks 90 and 92. Blocks 90 and 92, in turn, are supported upon and fixed to respective horizontal members 52 and 54 of support frame 42. Rotation is imparted to shaft 88 and thus to transporter 64 from a drive input pulley (not shown) about which is wound a belt 94 which extends to a corresponding output pulley mounted upon the gear reduction output of an electric motor represented generally at 96. Motor 96 is mounted upon a lower cross frame member 98 extending between the forward legs 30 of the apparatus (FIG. 3).

The idler rolls as at 86 at the rearward terminus of the transporter assembly 64 similarly are supported by a shaft 100 rotatably supported between spaced bearing blocks 102 and 104 (FIG. 2). Blocks 102 and 104, in turn, are fixed to and supported by respective horizontal frame members 44 and 46. Not shown in connection with the drive imparted to transporter 64 are such components as an AC speed control for providing operator flexibility in connection with the rate of movement of the conveyor components as well as conventional stop and start features and the like. Such complementing devices are well known in the art and conventionally provided in conjunction with the drives of sorting apparatus.

As is revealed in FIGS. 1 and 2, two parallel disposed drive shafts 106 and 108 are utilized to drive respective oscillatory surfaces 60 and 62. Rotational drive is imparted to shaft 106 by connection thereof with hydraulic motor 110, while corresponding drive is imparted to shaft 108 by virtue of a belt and pulley connection including pulleys 112 and 114 and associated belt 116. Note that shaft 108 is supported for rotation by a bearing block 118, in turn, fixed to and supported by cross member 48 of frame 40. Similarly, hydraulic motor 110 is supported by a bracket 120 which, in turn, is fixed to cross member 48. Hydraulic drive fluid is directed into and from motor 112 by respective conduits 122 and 124 which extend thereto from a pump and fluid reservoir 126. Appropriate controls and the like are provided for operating the reservoir and pump as are typical, provisions being made for varying the rotational output speed of motor 110 to suit the desire of the operator. Apparatus 10 further includes receptacles 128 and 130 which are positioned substantially at the termini 132 and 134 of respective oscillatory surfaces 60 and 62 such that they receive those objects which are not kinetically driven by the surfaces into the depressed, spaced upper receiving surfaces 74 of components 66 of transporter 64. Where the objects sorted are potatoes, earth clods and rocks, the earth clods and rocks will remain upon the upstanding coding surfaces described earlier at 70 and 72 in connection with FIGS. 4 and 5. Potatoes, however, will react dynamically to fall upon the earlier described receiving surfaces 74 and are carried therein to fall within receptacle 136. In the drawings thus far described, the length of transporter 64 is somewhat extended in the interest of clarity in the drawing. As is apparent, only a relatively small length of the transporter is required beyond the termini 132 and 134 of the oscillatory surfaces 60 and 62. Further apparent from the drawing, the potatoes, earth clods and rock are supported from two of the adjacent carrier components 66 associated therewith. As a consequence, a more positive contact and dynamic association is thereby realized between these objects and the oscillatory surfaces. In connection with the sorting of potatoes from earth clods and rocks, the high spring constant characteristic of the rock causes them to "clink" and vibrate against the associated oscillatory surface while not being driven upon the receiving region of transporter 64. Conversely, the very high damping factor associated with earth clods causes them to remain in contact with the oscillatory surface along the entire length of the sorting zone. The spacing of the adjacent carrier component 66 is selected between about one and two inches for the potato sorting technique and advantageously permits any dirt developed in the disintegration of the clods to fall harmlessly from the coding surface. In effect, the surfaces as at 70 and 72 remain substantially "clean" throughout the sorting procedure. Thus, improved sorting is made available and the potatoes or like objects collected at receptacle 136 are substantially free of dirt components.

Oscillatory surfaces 60 and 62 are identically structured and preferably have a cylindrical surface configuration as shown. Each of the oscillatory surfaces is mounted between supporting assemblies fixed to the frame of the apparatus. In this regard, surface 60 is shown in FIG. 1 to be mounted between support assemblies 140 and 142. Assembly 140, in turn, is mounted upon upper horizontal support 28, while support assembly 142 is mounted upon cross member 144 (FIG. 1) extending beneath and attached to components 80. Oscillatory surface 62 is mounted in identical fashion, one supporting assembly associated therewith being shown at 146 in FIGS. 2 and 3. Inasmuch as oscillatory surfaces 60 and 62 are identically structured, the detailed description thereof is provided hereinafter only in conjunction with surface 60.

Looking to FIG. 6A, support for shaft 106 at the input region of the apparatus 10 is revealed in detail. The upward portion of support assembly 140 is machined or suitably formed at 148 to provide an annular or cylindrically-shaped male bushing-like component. Additionally, this upward portion of the support is counterbored at each side thereof to receive the outer race of a bearing 150. Shaft 106 extends through bearing 150 to an eccentric bearing surface 152 formed integrally therewith. From eccentric bearing surface 152, the shaft is enlarged as at 154 and extends toward the terminus thereof. Surface 60 is shown supported by a bushing-like annular support component 156 which is formed having two oppositely disposed flange-like portions 158 and 160 of outer diameter equal to the internal diameter of surface 60 and the cylindrical portion 148 of support 140. Support component 156 additionally is bored to receive and rest against the outer race of a bearing 162. Bearing 162 is configured to receive the cylindrical but eccentrically disposed bearing surface 152. A flexible, cylindrically-shaped restraining member is fixed between bushing 148 and flange 160 to permit the vibration of but prohibit the rotation of surface 60.

The mounting arrangement for oscillatory surface 60 at the terminus 132 end is shown in FIG. 6B. Note that the enlarged portion 154 of shaft 106 is configured having an eccentric bearing surface or journal 166 adjacent a necked down portion thereof at 168. Shaft portion 168 extends through a bearing 170, the outer race of which nests within one side of a counterbored opening 172 within assembly 142. Journaled for rotation about eccentric but cylindrical surface 166 is a bearing 174, the outer race of which is fixed within an annular bushing-like supporting component 176. Component 176 is formed having two flange portions 178 and 180, portion 178 having a diameter suited for supporting surface 60 from the internal side thereof and flange 180 having a diameter adapted to receive a flexible rubber protective cylinder 182. Surface 166 is eccentric with respect to the axis of shaft portion 168 and the eccentricity is symmetrical or axially aligned with the corresponding eccentricity of earlier described surface 152. Thus, upon rotation of shaft 106, surface 60 moves to describe a locus of circular movement having a radius which varies in dependence upon the degree of eccentricity at surfaces 152 and 166. Where the objects sorted are potatoes, rocks and earth clods, this eccentricity preferably varies from about 0.075 to 0.150 inch and the frequency of the vibration of surface 60 preferably is selected within the range of about 30 to 70 Hertz. By providing an eccentricity at the input termini of the sorting zone as at surface 152, the length of the entire assembly advantageously may be shortened.

To achieve a dynamically balanced performance for the apparatus, counterweights are selectively positioned upon shaft 106 within the confines of cylindrical surface 60. Note in this regard in FIG. 6A, that a block-like counterweight 184 is fixed by machine screws 186 and 188 to shaft 106 at portion 154 thereof in the vicinity of bearing 162. Additionally, as revealed in FIG. 6B, a counterweight 190 is connected to shaft portion 154 within the confines of surface 60 by machine screws as at 192 and 194. Further improvements in the dynamic stability of the apparatus 10 may be provided by rotating shafts 106 and 108 in opposed rotational senses. Such an arrangement is particularly helpful where the sorting apparatus is mounted upon field harvesting implements.

Turning now to FIGS. 7 and 8, an adaptation of the sorting apparatus as shown generally at 10 to a potato harvester is shown. The drawings show the conventional harvesting components in somewhat schematic fashion in the interest of clarity; however, the adaptation is one taken in conjunction with principal components of a potato harvester marketed as model "Mark 76" by Lockwood Corporation, Gering, Nebraska.

Looking to FIG. 7, the potato harvester is represented generally at 200. Harvester 200 is configured to be drawn by a tractor and thus incorporates a main frame 202, the forward structural members of which converge at 204 to define a hitch for attachment with the tractor. The frame 202 is supported above the surface 206 of the field being planted by two pneumatic-tired wheels, one of which is revealed at 208. The figure further reveals quantities of potato tubers and rock 210 beneath surface 206, the potato vines 212 of which extend above the surface. As shown in FIG. 8, vines 212, representing two rows of planted potatoes, are schematically revealed and the harvester 200 is structured so as to extend over and simultaneously harvest two parallel rows. FIG. 7 shows the potatoes and rocks 210 as well as vines 212 coupled with the potatoes being dug by a boom-like assembly or apron 214 extending downwardly to the field surface level 206 from frame 202. At the forwardmost position of assemby 214, there are positioned two flat digger blades, one of which is revealed at 216 located below field surface level 206. These blades are aligned with the rows of plants and extend beneath the surface of the soil, a distance determined by the operator, a four-inch depth not being uncommon. Directly behind each of the digger blades as at 216, there extends within assembly 214 a primary digger conveyor 218 which passes about lower drive rolls as at 220 and extends within assembly 214 upwardly to pass about corresponding rolls pivoted upon an axis shown in FIG. 8 at 222. As evidenced from the latter figure, conveyor 218 is formed of a series of spaced and interlinked parallel bars which, at least in the vicinity of blade 216, as illustrated in the broken away portion of assembly 214 at 224, represents a significant bulk comprised of potatoes, earth and rock. As indicated earlier, should the harvester 200 operate at about two miles per hour (a slow speed with respect to current practice) with the digger blades set at a depth of four inches, the harvester aprons are lifting an average of six to ten tons of soil per minute. As this material at 224 is drawn upwardly by primary digger conveyor 218, a portion of the rocks and soil fall through the chain openings; however, a substantial quantity thereof remains upon the conveyor. Upon reaching the uppermost point provided by conveyor 218, the conveyed materials are dropped upon the relatively widely-spaced bars of an override deviner conveyor shown in FIG. 8 at 224. Generally, the potatoes, stones and now-formed earth clods pass through the relatively widely spaced bars of this chain conveyor while the vines, earlier described at 212, are removed by this activity from the potatoes to be deposited at the rear of the harvester 200 as represented at 226. Other devining implements may be added for carrying out this function as well as for pulverizing earth clods.

Potatoes, earth clods and stones falling through the spaced bars of deviner 224 fall upon a secondary digger conveyor 228 which provides a transporting and separation function internally of the periphery of deviner 224. Supported upon rolls having a rearwardly disposed axle shown in FIG. 8 at 230, the secondary digger conveyor 228 deposits potatoes, earth clods and stones upon a transversely-oriented rear cross conveyor shown in FIG. 8 at 232. As these objects are transported across the rear portion of harvester 200, a quantity of rock and earth clods fall through the spaced bars of conveyor 232 and the potatoes as well as earth clods and rock remaining upon conveyor 232 then are deposited upon a side elevator 234. Again formed of interlinked spaced bars, elevator 234 moves the objects deposited thereon upwardly to a position above frame 202 whereupon they are dropped at one side of a distributor belt 236. At this point, the potatoes, stones and earth clods are in position for distribution or introduction to an automatic sorting station according to the invention, located generally at 238. Conventional harvesters provide sorting platforms and positions for laborers to stand and hand sort the earth clods and rock from potatoes in this general region.

Station 238 is comprised of a plurality of sorting zones configured having substantial similarity to the apparatus described in connection with FIGS. 1-6. The zones are mounted upon harvester 200 in parallel adjacency in a manner wherein the cylindrical oscillatory surfaces thereof can react with the objects sorted from transporter coding support surfaces moving along opposed sides thereof. FIG. 8 reveals that station 238 incorporates a parallel series of nine cylindrical and identical oscillatory surfaces 240. As shown in FIGS. 7 and 10, the oscillatory surfaces 240 are supported upon harvester 200 at an elevation just below distributor conveyor 236 by a framework including structural components as at 242 in FIG. 7, 244 and 246 in FIG. 9, and 244 in FIG. 10. Intermediate each adjacent pair of oscillatory cylindrical surfaces 240 there is positioned a transporter conveyor, the discrete components of which are structured as shown and described earlier in connection with FIGS. 4 and 5, the outermost ones of which are identified in FIG. 8 at 248. Trapezoidally-shaped shields or covers, the outermost ones of which are identified at 250 in FIG. 8, are positioned over the centrally-disposed receiving surfaces of transporter 248 at the introductory region of each of the sorting zones. These covers are identical to those described earlier at 78 and serve the function of introducing the potatoes, earth clods and rocks to the upwardly-disposed coding surfaces described earlier at 70 and 72 of each transporter 48. Distribution of the rock, potatoes and earth clods to this introductory region of the sorting zones is carried out by the movement of these objects along distributor belt 236 operating in conjunction with a conventional kick-off roll 252 extending angularly thereacross. Roll 252 is rotationally mounted above belt 236 and driven in conventional fashion at a rate selected for causing transverse movement of the distributed objects.

As is revealed generally in FIG. 8, the potatoes reacting with oscillatory surfaces 240 are kinetically driven to the receiving surfaces described earlier at 74 of the transporter 248 and are carried forwardly within station 238 to be deposited upon the conveyor of a bulk boom 254. Boom 254 may assume a variety of orientations, however, it generally is utilized in the field for loading the potatoes deposited thereupon into the bed of a truck or like receiver shown in FIG. 8 at 256.

The rocks and earth clods remaining on the surfaces as described earlier at 70 and 72 are carried to the termini of oscillatory surfaces 240 whereupon they drop through openings, the outermost ones of which are identified at 258 in FIG. 8, to fall upon a clod and rock conveyor 260 extending transversely across harvester 200. This conveyor drops the rocks and clods in parallel disposed rows, one of which is revealed schematically at 262. Thus deposited, such rock components of this waste can be efficiently picked up and removed from the field by conventional machinery to improve the quality of the earth within the growing region.

Looking now to FIGS. 9 and 10, the drive system for cylindrical oscillatory surfaces 240 is revealed in more detail. As shown in FIG. 9, primary drive to the assemblage of surfaces 240 is provided by a singular hydraulic motor 270. The output shaft 272 or motor 270 is coupled to a drive pulley 274 serving to impart movement of an endless drive belt 276. Looking additionally to FIG. 10, belt 276 imparts rotational drive to pulleys 278, 280, 282 and 284. These pulleys are respectively fixed to drive shafts 286, 288, 290 and 292. The latter drive shafts extend laterally upwardly to respective flexible couplings 294, 296, 298 and 300 which, in turn, are coupled to the drive shafts 302 of oscillatory surfaces 240. These drive shafts correspond, for example, with shaft 106 described earlier herein. Belts 276 also extends over an idler pulley 304 and serves to provide power input to drive pulley 306 fixed to shaft 288. Pulley 306 serves to drive another endless belt 308 which extends about drive pulleys 310, 312 and 314 as well as idler pulleys 316 and 318, the latter being supported from bracket 320. Pulleys 310, 312 and 314 are fixed to respective drive shafts 322, 324 and 326, the opposite ends of which, in turn, are connected through respective flexible couplings 328, 330 and 332 to associated drive shafts 302 of oscillatory surfaces 240.

Similarly, a drive pulley 334 fixed to shaft 292 imparts drive through endless belt 336 to drive pulleys 338 and 340 and is passed over idler pulleys 342 and 344 mounted upon bracket 346. Pulleys 338 and 340 are fixed to respective drive shafts 348 and 350 which extend through respective flexible couplings 352 and 354 to oscillatory surface drive shafts 302 as shown.

Observation of the interconnection of the belts 276, 308 and 336 reveals that the drive imparted to the series of nine oscillatory surfaces 240 is one of successive counter rotation. With such an arrangement, the dynamic balance of the sorting station 238 is improved. Generally, the drive imparted to surfaces 240 is selected to derive a frequency from between about 30 and 70 Hertz and the amplitudes vary from 0.075 at the introductory region thereof to 0.150 inch at the end terminus. These amplitudes are provided by the earlier described eccentric surfaces within the drive shaft assemblies. Further, the extent of the upwardly-disposed support surfaces as at 70 and 72 of the transporters preferably is about three inches, while the angle thereof with respect to horizontal may be selected from between about 20° and 40°, 30° being a logical mean therebetween.

Since certain changes may be made in the method and apparatus without departing from the scope of the invention herein involved, it is intended that all matter contained in the description thereof or shown in the accompanying drawings shall be interpreted as illustrative and not in a limiting sense.

What is claimed is:

1. Sorting apparatus for objects exhibiting identifiable dynamic response to vibrational phenomena comprising:

means for introducing a quantity of said objects at the entrance location of a sorting zone extending along a given longitudinal axis to an exit location;

means defining an oscillatory surface within said zone and extending along said longitudinal axis;

drive means including a dynamically balanced rotative drive member actuable to impart oscillation of predetermined frequency and amplitude characteristics to said oscillatory surface;

transporter means including a plurality of regularly-spaced parallel carrier components pivotally interconnected in endless chain-like fashion to define a conveyor within said zone extending from said entrance location in parallel relationship with said longitudinal axis, each said carrier component having an upwardly disposed support surface when within said zone extending outwardly from a location adjacent said oscillatory surface at a predetermined angle of inclination with respect to horizontal, said spacing being selected to provide a two position support for said objects upon adjacent said support surfaces while moving them within said zone in orientations promoting the kinetic reaction thereof with said oscillatory surface;

means adjacent said zone for receiving reacted said objects exhibiting predetermined dynamic response characteristics to said kinetic reaction; and means for simultaneously actuating said drive means and said transporter means.

2. The sorting apparatus of claim 1 in which said drive means rotative drive member is configured to impart a said oscillation of varying amplitude commencing from a lowest value in the vicinity of said entrance location of said sorting zone and progressively increasing outwardly therefrom.

3. The sorting apparatus of claim 2 in which said objects are potatoes, earth clods and rocks and said drive means frequency is selected from between about 30 and 70 Hertz and said amplitude is selected between about 0.0 and 0.150 inch.

4. The sorting apparatus of claim 3 in which said transporter means support surfaces predetermined angle is selected from between about 20° and 40°.

5. The sorting apparatus of claim 2 in which:

(a) said drive means comprises:

a said drive member present as an elongate shaft extending along said longitudinal axis from a first terminus in the vicinity of said entrance location to a second terminus in the vicinity of said exit location;

bearing means for supporting said shaft at least in the vicinity of said first and second termini for symmetrical rotation about said longitudinal axis;

means defining a first bearing surface situate upon said shaft in the vicinity of said first terminus, moveable in driven relationship with said shaft and having an axis of rotation eccentric with respect to said longitudinal axis;

means defining a second bearing surface situate upon said shaft in the vicinity of said second terminus, moveable in driven relationship with said shaft and having an axis of rotation eccentric with respect to said longitudinal axis, the extent of said eccentricity being greater than that of said first bearing surface;

counterweight means associated with said shaft for deriving said dynamic balance;

(b) said means defining an oscillatory surface comprises:

a first supporting component arranged in driven relationship with said first bearing surface and fixed to said oscillatory surface so as to convey an oscillatory motion thereto of first amplitude value when said shaft is rotated; and a second supporting component arranged in driven relationship with said second bearing surface and fixed to said oscillatory surface so as to convey an oscillatory motion thereto of second amplitude value when said shaft is rotated.

6. The sorting apparatus of claim 1 in which said introducing means is configured with respect to said drive means to effect a sequential, single-file introduction of said objects only to said support surfaces of transporter means carrier components.

7. Sorting apparatus for objects exhibiting identifiable dynamic response to vibrational phenomena comprising:

means for introducing a quantity of said objects at the entrance location of a sorting zone extending along a given longitudinal axis to an exit location;

means defining an oscillatory surface within said zone and extending along said longitudinal axis;

drive means including a dynamically balanced rotative drive member actuable to impart oscillation of predetermined frequency and amplitude characteristics to said oscillatory surface;

transporter means including a plurality of regularly-spaced parallel carrier components pivotally interconnected in endless chain-like fashion to define a conveyor within said zone extending from said entrance location to said exit location in parallel relationship with said longitudinal axis, each said carrier component having an upwardly disposed support surface when within said zone extending outwardly from a location adjacent said oscillatory surface to a terminus at a predetermined angle of inclination with respect to horizontal, said spacing being selected to provide a two position support upon adjacent said support surfaces for said objects while moving them within said zone in orientations promoting the kinetic reaction thereof with said oscillatory surface, each said carrier component further having an upwardly disposed receiving surface when within said zone extending horizontally outwardly from the vicinity of said terminus for receiving and transporting reacted said objects exhibiting predetermined dynamic response characteristics of said kinetic reaction;

means adjacent said zone exit location for receiving said reacted objects; and means for simultaneously actuating said drive means and said transporter means.

8. The sorting apparatus of claim 7 in which said drive means rotative drive member is configured to impart a said oscillation of varying amplitude commencing from a lowest value in the vicinity of said entrance location of said sorting zone and progressively increasing outwardly therefrom.

9. The sorting apparatus of claim 8 in which said objects are potatoes, earth clods and rocks and said drive means frequency is selected from between about 30 and 70 Hertz and said amplitude is selected between about 0.0 and 0.150 inch.

10. The sorting apparatus of claim 9 in which said transporter means support surfaces predetermined angle is selected from between about 20° and 40°.

11. The sorting apparatus of claim 9 in which said support surface has a lengthwise extent of about three inches.

12. The sorting apparatus of claim 9 in which the said regular spacing of said parallel carrier components is selected between about one and two inches.

13. The sorting apparatus of claim 7 in which the receiving surface of each said carrier component is positioned at a level beneath said coding support surface terminus when within said sorting zone.

14. The sorting apparatus of claim 7 in which:

(a) said drive means comprises:

a said drive member present as an elongate shaft extending along said longitudinal axis from a first terminus in the vicinity of said entrance location to a second terminus in the vicinity of said exit location;

bearing means for supporting said shaft at least in the vicinity of said first and second termini for symmetrical rotation about said longitudinal axis;

means defining a first bearing surface situate upon said shaft in the vicinity of said first terminus, moveable in driven relationship with said shaft and having an axis of rotation eccentric with respect to said longitudinal axis;

means defining a second bearing surface situate upon said shaft in the vicinity of said second terminus, moveable in driven relationship with said shaft and having an axis of rotation eccentric with respect to said longitudinal axis, the extent of said eccentricity being greater than that of said first bearing surface;

counterweight means associated with said shaft for deriving said dynamic balance;

(b) said means defining an oscillatory surface comprises:

a first supporting component arranged in driven relationship with said first bearing surface and fixed to said oscillatory surface so as to convey an oscillatory motion thereto of first amplitude value when said shaft is rotated; and a second supporting component arranged in driven relationship with said second bearing surface and fixed to said oscillatory surface so as to convey an oscillatory motion thereto of second amplitude value when said shaft is rotated.

15. The sorting apparatus of claim 14 in which said objects are potatoes, earth clods and rocks and said first amplitude value is about 0.075 inch and said second amplitude value is about 0.150 inch.

16. The sorting apparatus of claim 7 in which said introducing means is configured with respect to said drive means to effect a sequential, single-file introduction of said objects only to said support surfaces of transporter means carrier components.

17. The method for sorting a quantity of discrete objects exhibiting classifiable dynamic response to vibrational phenomena comprising the steps of:

introducing a quantity of said objects to the input of a sorting zone;

supporting each said object by two spaced thin linear support surfaces while moving said objects in sequential, single-file fashion in a given direction through said zone;

simultaneously with said movement, promoting a kinetic reaction of said objects by contact thereof with a curved surface disposed along said zone and oscillating at a predetermined frequency and at amplitudes increasing in value along said zone respectively from said input to the output thereof;

receiving said objects of one class dynamically reacting to said contact by ejective movement transverse to said given direction; and receiving said objects of another class transported through said zone and exiting from said output thereof.

18. The method for sorting objects of claim 17 wherein said objects are potatoes, earth clods and rocks and said amplitudes are selected within a range of about 0.075 to 0.150 inch.

19. The method for sorting objects of claim 17 wherein said objects are potatoes, earth clods and rocks and said frequency is selected from within the range of about 30 to 70 Hertz.

20. The method for sorting objects of claim 17 wherein said objects are potatoes, earth clods and rocks in which the step for promoting a kinetic reaction by contact with said oscillating surface is gravitationally affected by the inclination of said coding support surfaces, said inclination being selected between about 20° and 40° with respect to horizontal.

21. The method for sorting objects of claim 17 in which the step for promoting a kinetic reaction by contact with said surface is provided by an oscillation thereof wherein any point of the surface moves about a circular locus, the diameter of which is equivalent to the said amplitude of oscillation.

22. In potato harvesting apparatus of a variety wherein means are provided for mechanically removing potato laden vines from beneath the surface of the earth situs of their growth, means for separating said vines therefrom, means conveying said potatoes with unseparated rocks and earth clods to a region upon said apparatus designated for separating said potatoes from said rocks and earth clods, the improvement comprising:

means for introducing said potatoes with unseparated rocks and earth clods from said conveying means to the entrance of a sorting zone situate upon said harvesting apparatus and extending along a given longitudinal axis to an exit location;

means defining an oscillatory surface within said zone and extending along said longitudinal axis;

drive means including a dynamically balanced rotative drive member actuable to impart to said oscillatory surface oscillation of predetermined frequency and at amplitudes increasing in value along said zone from said entrance toward said exit;

transporter means including a plurality of regularly-spaced parallel carrier components pivotally interconnected in endless chain-like fashion to define a conveyor within said zone extending from said entrance in parallel relationship with said longitudinal axis, each said carrier component having an upwardly disposed support surface when within said zone extending outwardly from a location adjacent said oscillatory surface at a predetermined angle of inclination with respect to horizontal, said spacing being selected to provide a two position support for said potatoes, rocks and earth clods upon adjacent said support surfaces while moving them within said zone in an orientation promoting the kinetic reaction thereof with said oscillatory surface;

means adjacent said conveyor for receiving potatoes transversely ejected from said zone; and means adjacent said zone exit for disposing of said rocks and earth clods.

23. The improved potato harvesting apparatus of claim 22 wherein said drive means frequency is selected from between about 30 and 70 Hertz and said amplitudes are selected between about 0.0 and 0.150 inch.

24. The improved potato harvesting apparatus of claim 22 in which said transporter means support surfaces predetermined angle is selected from between about 20° and 40°.

25. In potato harvesting apparatus of a variety wherein means are provided for mechanically removing potato laden vines from beneath the surface of the earth situs of their growth, means for separating said vines therefrom, means conveying said potatoes with unseparated rocks and earth clods to a region upon said apparatus designated for separating said potatoes from said rocks and earth clods, the improvement comprising:

means for introducing said potatoes with unseparated rocks and earth clods from said conveying means to the entrance of a sorting zone situate upon said harvesting apparatus and extending along a given longitudinal axis to an exit location;

means for defining an oscillatory surface within said zone and extending along said longitudinal axis;

drive means including a dynamically balanced rotative drive member actuable to impart to said oscillatory surface oscillation of predetermined frequency and at amplitudes increasing in value along said zone from said entrance toward said exit;

transporter means including a plurality of regularly-spaced parallel carrier components pivotally interconnected in endless chain-like fashion to define a conveyor within said zone extending from said entrance to said exit in parallel relationship with said longitudinal axis, each said carrier component having an upwardly disposed support surface when within said zone extending outwardly from a location adjacent said oscillatory surface to a terminus at a predetermined angle of inclination with respect to horizontal, said spacing being selected to provide a two position support upon adjacent said support surface for said potatoes, rocks and earth clods while moving them within said zone in orientations promoting the kinetic reaction thereof with said oscillatory surface, each said carrier component further having an upwardly disposed receiving surface when within said zone extending horizontally outwardly from the vicinity of said terminus for receiving and transporting reacted said potatoes;

means adjacent said zone exit location for disposing of said reacted stones and earth clods; and loading means having an input adjacent said zone exit and said carrier receiving surface for conveying said reacted potatoes to containment means.

26. The improved potato harvesting apparatus of claim 25 wherein a plurality of said sorting zones are mounted upon said apparatus in parallel adjacency each having a cylindrically-shaped said oscillatory surface; and said transporter means intermediate adjacent ones of said oscillatory surfaces having said carrier components configured to provide a single said upwardly disposed receiving surface positioned intermediate oppositely disposed said support surfaces.

27. The improved potato harvesting apparatus of claim 25 wherein said drive means frequency is selected from between about 30 and 70 Hertz and said amplitudes are selected between about 0.0 and 0.150 inch.

28. The improved potato harvesting apparatus of claim 25 in which said support surface has a lengthwise extent of about three inches.

29. The improved potato harvesting apparatus of claim 27 in which said support surface has a lengthwise extent of about three inches.

30. The improved potato harvesting apparatus of claim 25 in which the said regular spacing of said parallel carrier components is selected between about one and two inches.

31. The improved potato harvesting apparatus of claim 25 in which:

(a) said drive means comprises:

a said drive member present as an elongate shaft extending along said longitudinal axis from a first terminus in the vicinity of said entrance location to a second terminus in the vicinity of said exit location;

bearing means for supporting said shaft at least in the vicinity of said first and second termini for symmetrical rotation about said longitudinal axis;

means defining a first bearing surface situate upon said shaft in the vicinity of said first terminus, moveable in driven relationship with said shaft and having an axis of rotation eccentric with respect to said longitudinal axis;

means defining a second bearing surface situate upon said shaft in the vicinity of said second terminus, moveable in driven relationship with said shaft and having an axis of rotation eccentric with respect to said longitudinal axis, the extent of said eccentricity being greater than that of said first bearing surface;

counterweight means associated with said shaft for deriving said dynamic balance;

(b) said means defining an oscillatory surface comprises:

a first supporting component arranged in driven relationship with said first bearing surface and fixed to said oscillatory surface so as to convey an oscillatory motion thereto of first amplitude value when said shaft is rotated; and a second supporting component arranged in driven relationship with said second bearing surface and fixed to said oscillatory surface so as to convey an oscillatory motion thereto of second amplitude value when said shaft is rotated.

32. The improved potato harvesting apparatus of claim 31 in which said first amplitude value is about 0.075 inch and said second amplitude value is about 0.150 inch.

33. The improved potato harvesting apparatus of claim 25 in which said introducing means is configured with respect to said drive means to effect a sequential, single-file introduction of said objects only to said support surfaces of transporter means carrier components.

34. The improved potato harvesting apparatus of claim 25 in which the receiving surface of each said carrier component is positioned at a level beneath said support surface terminus when within said sorting zone.

* * * * *